(12) United States Patent
McCorkendale et al.

(10) Patent No.: US 8,353,058 B1
(45) Date of Patent: Jan. 8, 2013

(54) METHODS AND SYSTEMS FOR DETECTING ROOTKITS

(75) Inventors: Bruce McCorkendale, Manhattan Beach, CA (US); Sourabh Satish, Fremont, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 738 days.

(21) Appl. No.: 12/410,166

(22) Filed: Mar. 24, 2009

(51) Int. Cl.
*G08B 29/00* (2006.01)
*G08B 23/00* (2006.01)
*G06F 12/14* (2006.01)
*G06F 15/173* (2006.01)
*H04L 9/00* (2006.01)

(52) U.S. Cl. ............ 726/34; 726/22; 713/192; 713/193; 713/194; 380/2; 704/224

(58) Field of Classification Search .............. 726/22, 726/34; 713/192–194; 380/2; 709/224
See application file for complete search history.

(56) References Cited

U.S. PATENT DOCUMENTS

| | | | |
|---|---|---|---|
| 5,922,075 A | 7/1999 | Bowker | |
| 6,357,003 B1 * | 3/2002 | Zarrin et al. | 713/2 |
| 2005/0114660 A1 * | 5/2005 | Lee et al. | 713/166 |
| 2005/0251864 A1 * | 11/2005 | Kelley et al. | 726/26 |
| 2007/0005957 A1 * | 1/2007 | Sahita et al. | 713/156 |
| 2007/0176756 A1 * | 8/2007 | Friedrich | 340/10.51 |
| 2008/0235791 A1 * | 9/2008 | Ivanov et al. | 726/21 |
| 2009/0192780 A1 * | 7/2009 | Carbone et al. | 703/23 |
| 2009/0204811 A1 * | 8/2009 | Fries et al. | 713/160 |

OTHER PUBLICATIONS

Eagle, Chris et al.; "Next Generation Collaborative Reversing with Ida Pro and CollabREate"; (accessed on May 14, 2009). http://www.blackhat.com/presentations/bh-usa-08/Eagle_Vidas/BH_US_08_Eagle_Vidas_Collabreate_pres.pdf.
Embleton, Shawn et al.; "SMM Rootkits:White Paper"; Aug. 2008; Clear Hat Consulting, Inc.; www.clearhatconsulting.com.
Suiche, Matthew; "SMM Rootkit limitations. (and how to defeat it :-))"; (accessed May 15, 2009); Matthew Suiches blog!. http://www.msuiche.net/2008/08/06/smm-rootkit-limitations-and-how-to-defeat-it/.
Collins, Robert R.; "Intel's System Management Mode"; (accessed May 19, 2009); http://www.rcollins.org/ddj/Jan97/Jan97.html.

* cited by examiner

*Primary Examiner* — Aravind Moorthy
(74) *Attorney, Agent, or Firm* — Advantedge Law Group

(57) ABSTRACT

A computer-implemented method for detecting rootkits is disclosed. The computer-implemented method may include sending periodic security communications from a privileged-processor-mode region of a computing device. The computer-implemented method may also include identifying at least one of the periodic security communications. The computer-implemented method may further include determining, based on the periodic security communications, whether the privileged-processor-mode region of the computing device has been compromised. Various other methods, systems, and computer-readable media are also disclosed.

19 Claims, 6 Drawing Sheets

METHODS AND SYSTEMS FOR DETECTING ROOTKITS

BACKGROUND

Rootkits are programs that use system hooking or modification to hide files, processes, registry keys, and other objects in order to hide malicious behaviors. Malicious programmers seek to develop rootkits that are difficult to detect and remove. One particularly difficult rootkit to detect is a rootkit hidden in a System Management Mode ("SMM") region of a computing device. Such rootkits are referred to as SMM rootkits.

An SMM rootkit may access SMM memory space, which may be referred to as System Management Random Access Memory ("SMRAM"), to install a malicious System Management Interrupt ("SMI") handler. The SMM rootkit may make SMRAM visible for reading and writing and may then write the SMI handler to the SMRAM. An SMI handler may operate as a chipset-level keylogger and a network backdoor. As such, an SMI handler may be able to steal sensitive information from an infected computer. SMM rootkits may also be programmed to perform various other malicious behaviors.

After installing the SMM handler, the rootkit may lock the SMRAM, which may make the SMRAM invisible from non-SMM processor modes. Thus, the malicious SMI handler may be difficult to detect and remove. What is needed, therefore, is an effective mechanism for defending against and detecting SMM rootkits.

SUMMARY

Embodiments of the instant disclosure provide methods and systems for sending a heartbeat from a privileged-processor-mode region of a computing device to enable detection of corruption of the privileged-processor-mode region. For example, a communication module may send periodic security communications from a privileged-processor-mode region of a computing device. A security module may identify at least one of the periodic security communications and may determine, based on the periodic security communications, whether the privileged-processor-mode region of the computing device has been compromised.

In some embodiments, the security module may identify a first security communication and determine whether the privileged-processor-mode region of the computing device has been compromised by determining that a second security communication was not received at an expected time. In other embodiments, the security module may determine whether the privileged-processor-mode region of the computing device has been compromised by determining that a security communication from the communication module does not include an expected security code.

In certain embodiments, the security module may be located on the same computing system that includes the communication module sending communications from the privileged-processor-mode region. In other embodiments, the security module may be located on a remote computing device. The communication module may send a periodic communication by storing a security communication in a first storage location on a computing device. In other embodiments, the communication module may send the security communication to a remote computing device through a network interface. In such embodiments, the periodic security communications may include Universal-Datagram-Protocol ("UDP") packets.

In various embodiments, the security module, the communication module, or other security code may lock the privileged-processor-mode region of the computing device such that the privileged-processor-mode region is read-only. For example, security code may set a D_LCK bit in a system-management-control register of a computing device.

In various embodiments, the computing device may include an x86 processor, and the privileged-processor-mode region of the computing device may include System Management Random Access Memory ("SMRAM") space. Similarly, the security code may include a System Management Interrupt ("SMI") handler. If the security module detects that the privileged-processor-mode region of the computing device has been compromised, the security module may perform a security action (e.g., notifying a user or a security software vendor of a potential risk).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
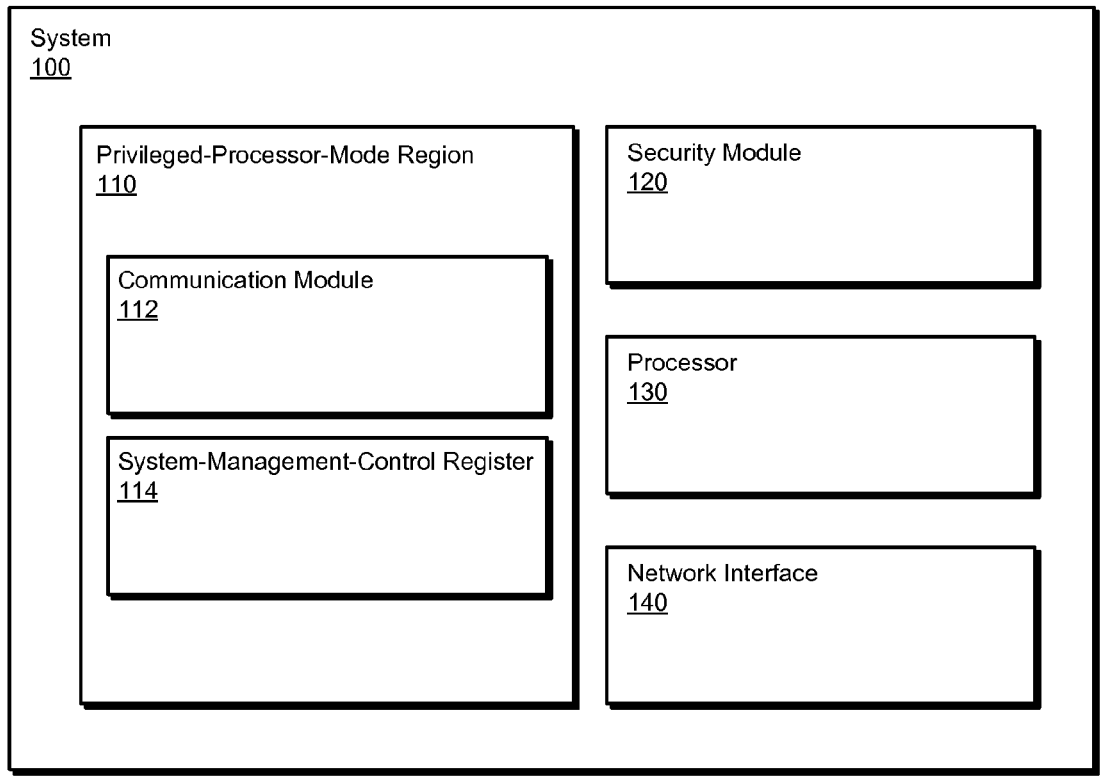
FIG. 1 is a block diagram of an exemplary system for detecting rootkits according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
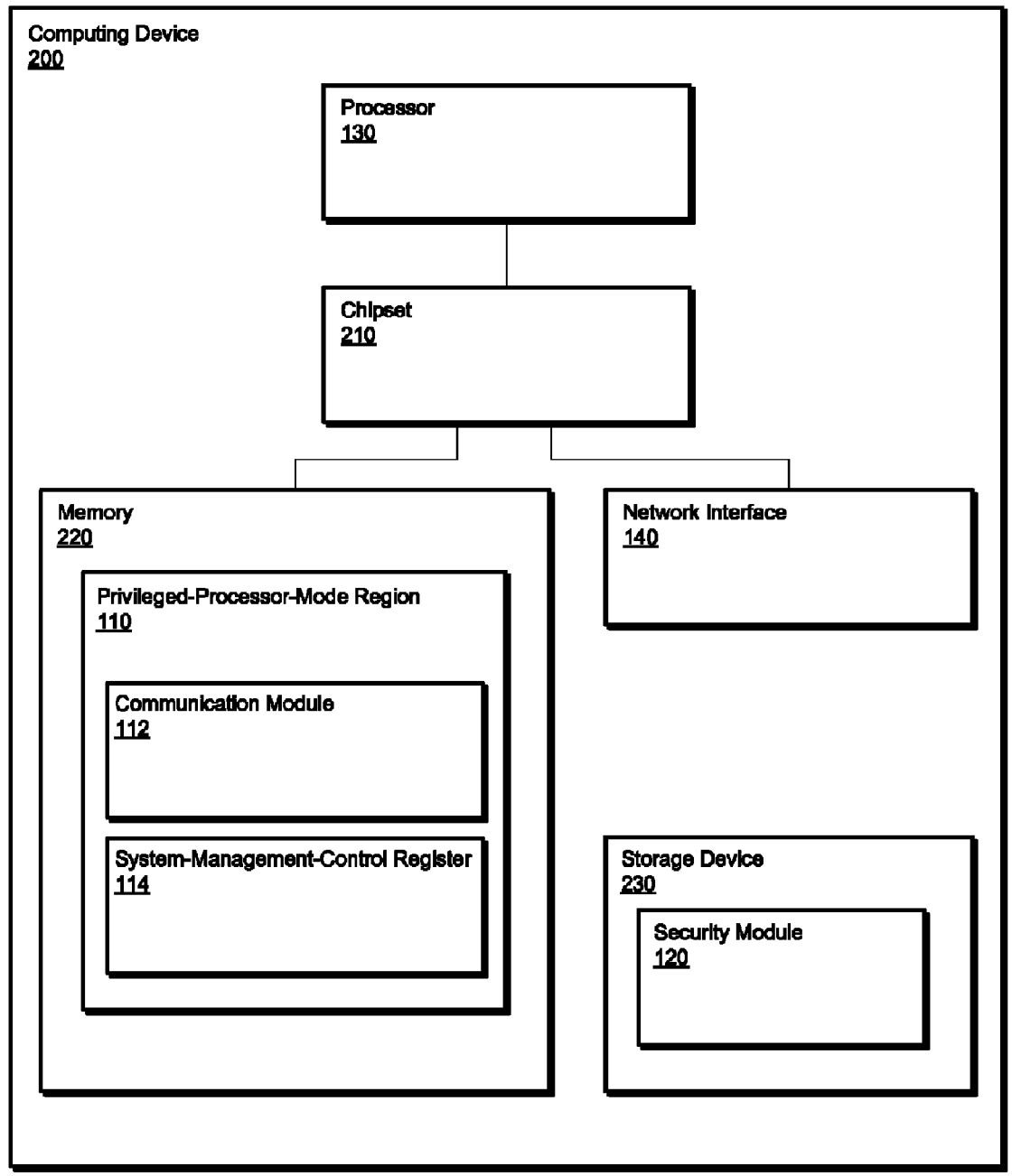
FIG. 2 is another block diagram of another exemplary system for detecting rootkits according to certain embodiments.
Figure 3:
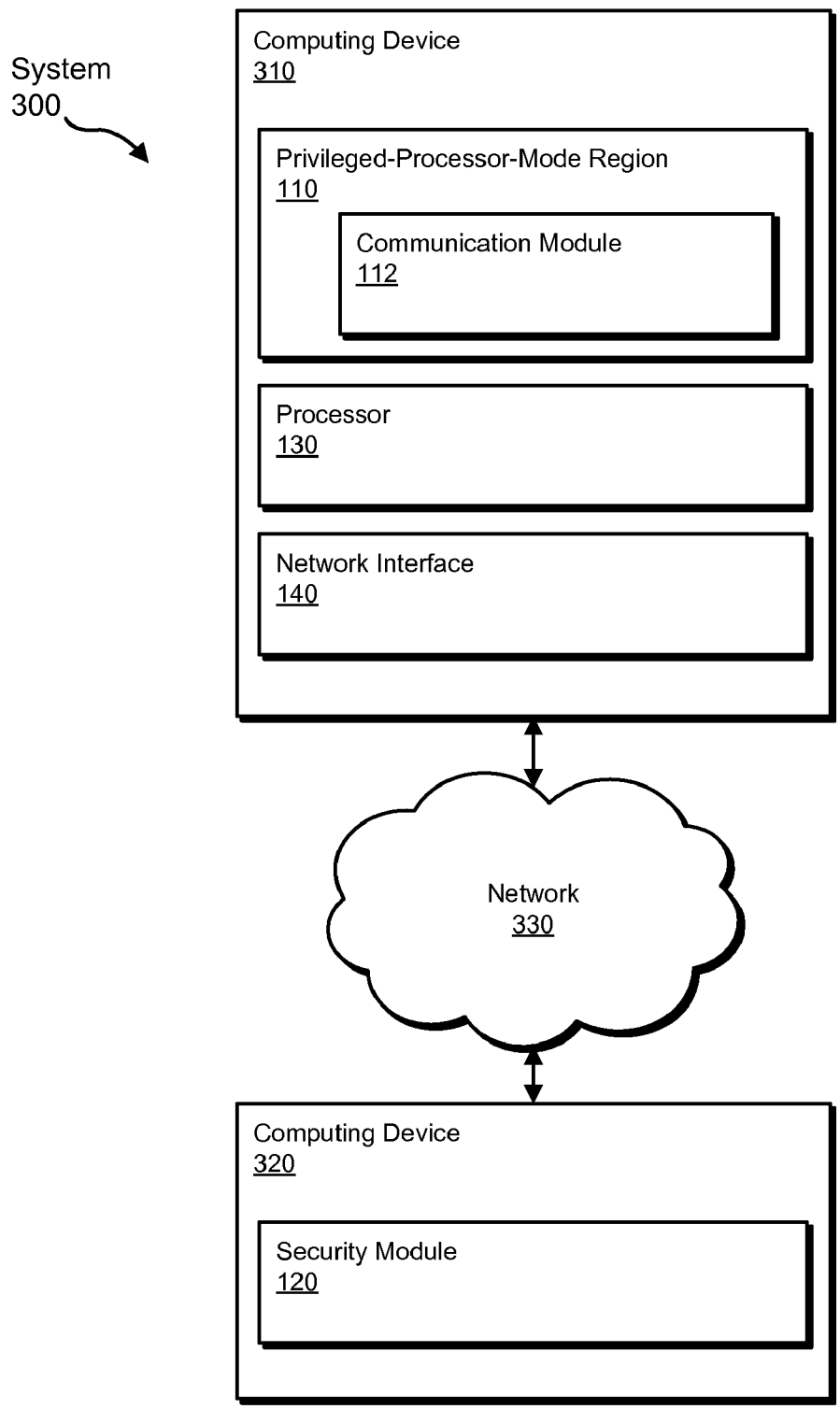
FIG. 3 is another block diagram of another exemplary system for detecting rootkits according to certain embodiments.
Figure 4:
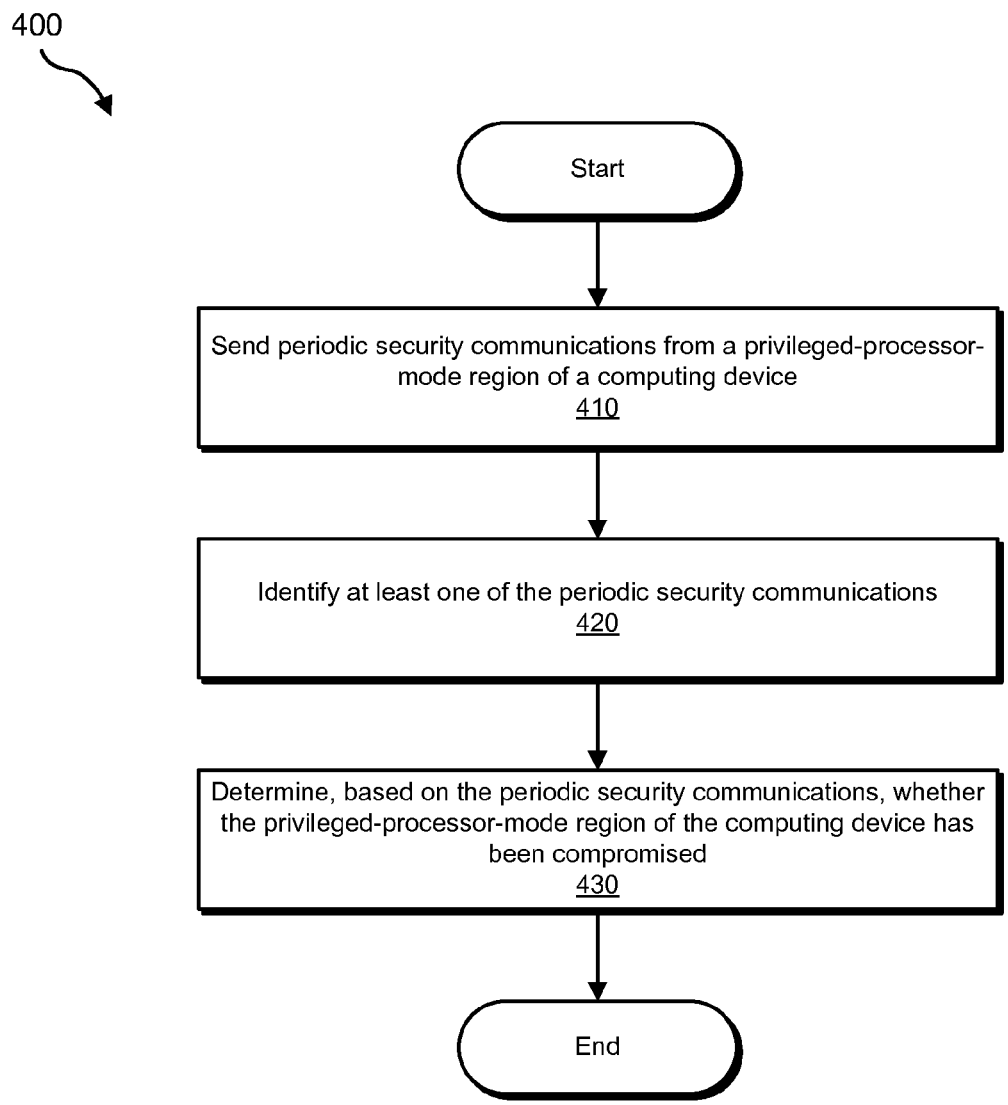
FIG. 4 is a flow diagram of an exemplary method for detecting rootkits according to certain embodiments.
Figure 5:
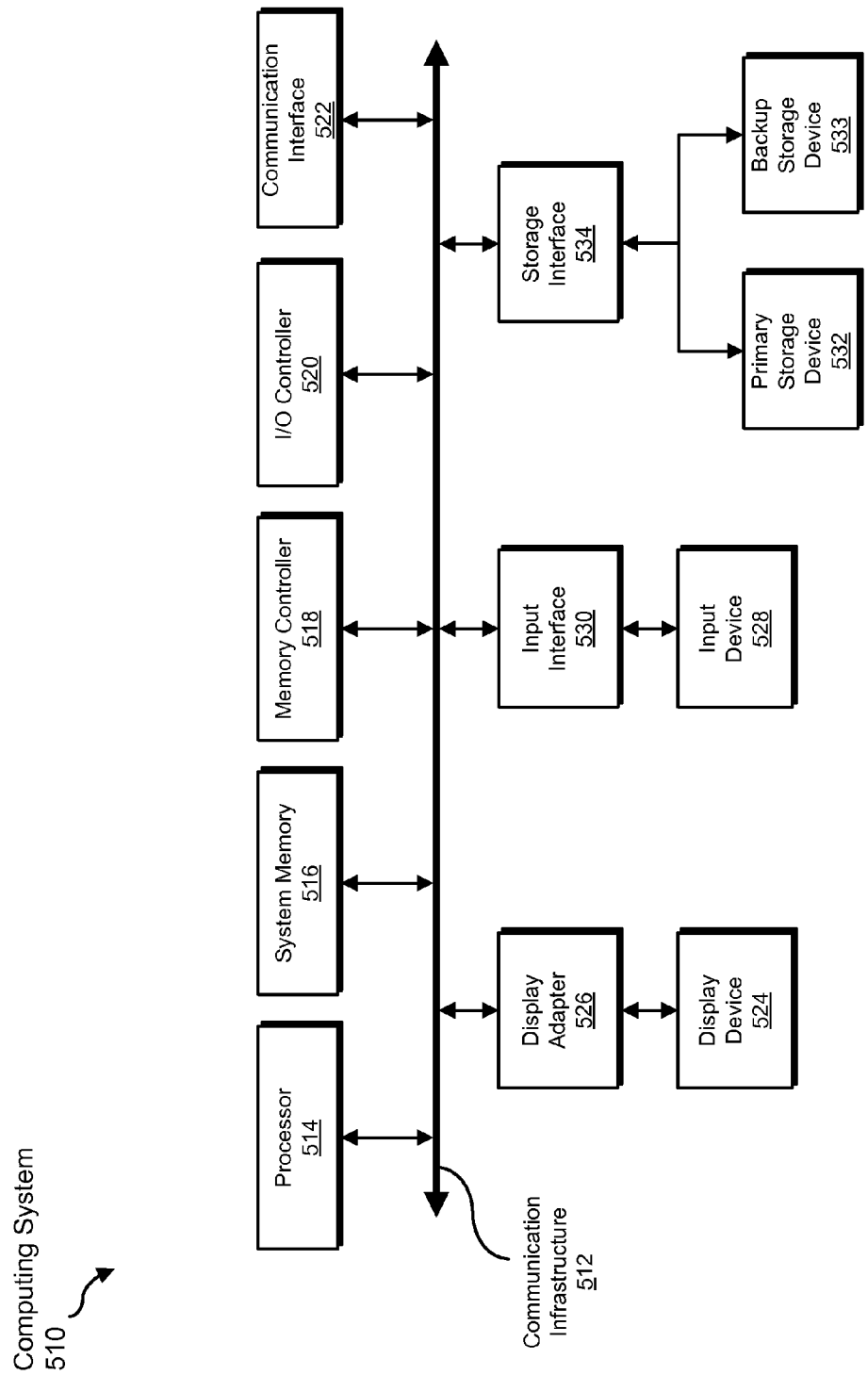
FIG. 5 is a block diagram of an exemplary computing system capable of implementing one or more of the embodiments described and/or illustrated herein.
Figure 6:
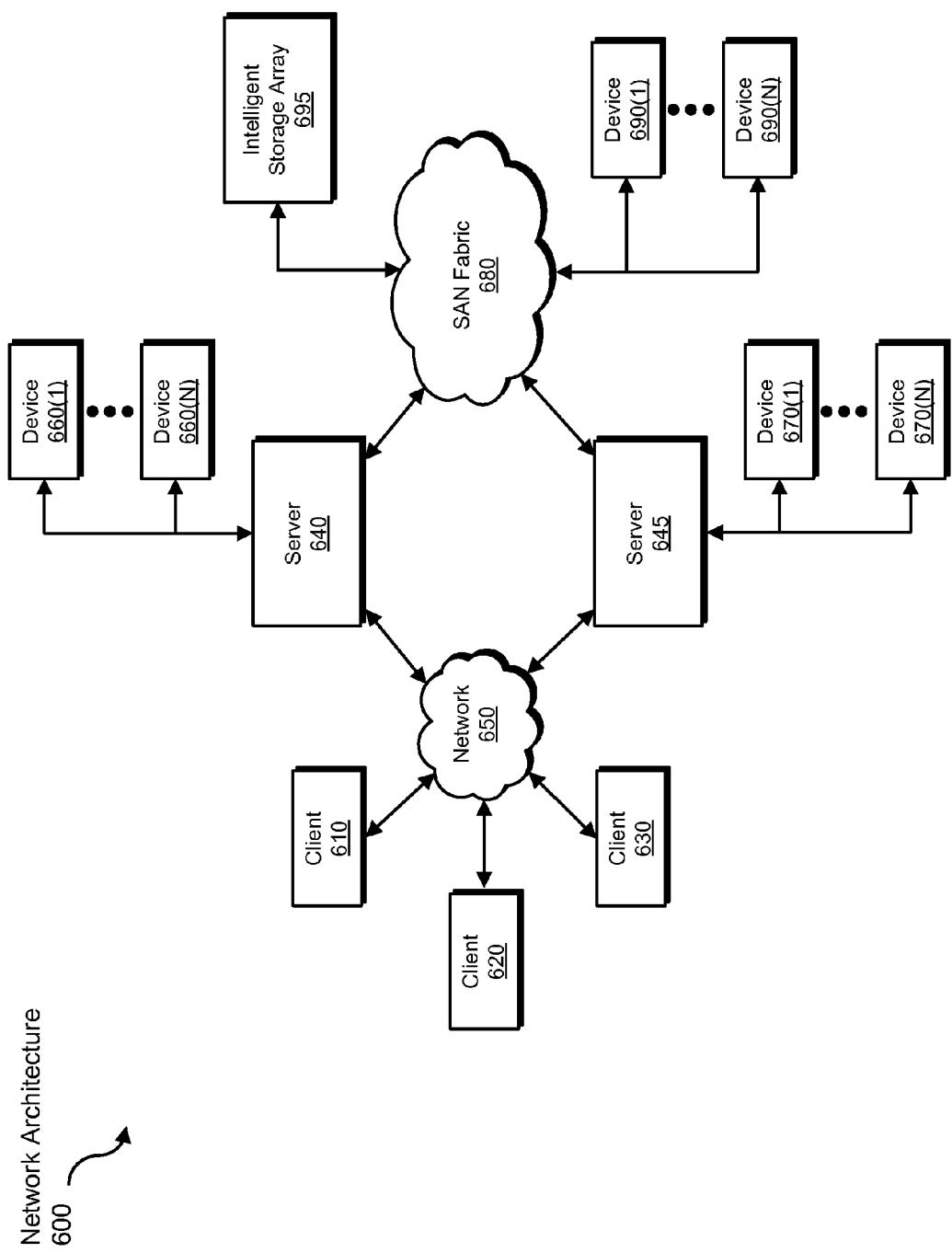
FIG. 6 is a block diagram of an exemplary computing network capable of implementing one or more of the embodiments described and/or illustrated herein.

Embodiments of the instant disclosure provide various methods and systems for detecting rootkits. In some embodiments, security software may be provided for sending periodic security communications from a privileged-processor-mode region of a computing device. The periodic security communications may be used to determine whether the privileged-processor-mode region of the computing device has been compromised by a rootkit. FIGS. 1-3 show exemplary systems for detecting rootkits, and FIG. 4 shows an exemplary method for accomplishing the same. FIGS. 5 and 6 illustrate an exemplary network and computing system for implementing embodiments of the instant disclosure.

FIG. 1 illustrates an exemplary rootkit-detection system 100. System 100 may include a privileged-processor-mode region 110, a security module 120, a processor 130, and a network interface 140. Privileged-processor-mode region 110 may include any memory space or other data storage associated with a privileged-processor-mode of a computing device. Privileged-processor-mode region 110 may be isolated from other memory and may be locked against write access from other processor modes. Privileged-processor-mode region 110 may also be hidden from other processor modes.

A privileged-processor-mode may include an operating mode used for advanced power-management features, system events (e.g., memory or chipset errors), system safety functions (e.g., shutdown on high CPU temperature), emulation of motherboard hardware that is unimplemented or buggy, emulation of a PS-2 mouse or keyboard from a USB mouse or keyboard, system configuration, and/or to emulate or forward calls to a Trusted Platform Module ("TPM"). In some embodiments, a privileged-processor-mode may provide operating-system-independent functions. An example of a privileged-processor mode is INTEL's System Management Mode ("SMM"). In SMM, privileged-processor-mode region 110 may be referred to as System Management Random Access Memory ("SMRAM").

Code and data stored in privileged-processor-mode region 110 may be referred to as a privileged-processor-mode handler or a privileged-processor-mode interrupt handler. A processor may enter a privileged-processor mode in response to an interrupt. The interrupt may cause control to be transferred to a privileged-processor-mode interrupt handler. An example of a privileged-processor-mode interrupt handler is a System Management Interrupt ("SMI") handler.

Privileged-processor-mode region 110 may include a communication module 112, which may be programmed to send periodic security communications, which are also referred to herein as heartbeats. In some embodiments, communication module 112 may be incorporated into other software programs that run in privileged-processor-mode region 110. For example, communication module 112 may be included in legitimate privileged-processor-mode code, which may include debugging code, power management code, and/or any other suitable privileged-processor-mode program. In other embodiments, communication module 112 may be installed in privileged-processor-mode region 110 as a standalone module. For example, communication module 112 may be a privileged-processor-mode interrupt handler.

Privileged-processor-mode region 110 may include a system-management-control register 114. System-management-control register 114 may provide various control values for privileged-processor-mode region 110. In particular, system-management-control register 114 may include a bit (or any data) that indicates whether privileged-processor-mode region 110 is locked against write access from other processor modes. System-management-control register 114 may also include a bit (or any data) that indicates whether privileged-processor-mode region 110 is hidden from other processor modes. In SMM, SMRAM may be locked by setting a D_LCK bit in a SMRAM control register. SMRAM may be hidden from view by clearing a D_OPEN bit in the SMRAM control register.

As previously mentioned, system 100 may also include a security module 120. Security module 120 may be programmed to identify periodic security communications from communication module 112. Security module 120 may also be programmed to determine, based on the periodic security communications, whether privileged-processor-mode region 110 has been compromised. For example, security module 120 may be programmed to determine whether privileged-processor-mode region 110 has been compromised by determining that a security communication was not received at an expected time. Additionally or alternatively, security module 120 may determine whether privileged-processor-mode region 110 has been compromised by determining that a security communication does not include an expected security code.

System 100 may also include a processor 130. Processor 130 may include any suitable microprocessor or Central Processing Unit ("CPU"). In some embodiments, processor 130 may include a processor with an x86 instruction-set architecture. In addition to processor 130, system 100 may include network interface 140, which may include any network hardware and/or software configured to allow system 100 to communicate over a network. In some embodiments, communication module 112 may directly access network interface 140 to send periodic security communications to a remote computing device.

FIG. 2 illustrates a computing device 200 that provides an exemplary configuration of components of system 100. FIG. 2 shows security module 120 on the same computing device as privileged-processor-mode region 110 and communication module 112. Computing device 200 generally represents any type or form of computing device capable of reading computer-executable instructions. Examples of computing device 200 include, without limitation, laptops, desktops, servers, cellular phones, personal digital assistants ("PDAs"), multimedia players, embedded systems, combinations of one or more of the same, exemplary computing system 510 in FIG. 5, or any other suitable computing device.

Computing device 200 may include processor 130, network interface 140, a chipset 210, memory 220, and a storage device 230. Chipset 210 may include one or more circuits and/or chips that link processor 130 to memory 220 and network interface 140. For example, chipset 210 may include a northbridge that links processor 130 to memory 220 and a southbridge that links processor 130 to network interface 140. Memory 220 may include any suitable computer storage. For example, memory 220 may include random access memory ("RAM"), such as SMRAM.

As noted, computing device 200 may also include a storage device 230, which may store security module 120. In the configuration shown in FIG. 2, communication module 112 may send periodic security communications to security module 120 by storing messages in storage device 230 and/or any other storage device of computing device 200. Communication module 112 may also send periodic security communications to security module 120 using any other suitable communication mechanism.

FIG. 3 illustrates a system 300 that provides an exemplary configuration of components of system 100 with communication module 112 and security module 120 on different computing devices. For example, a computing device 310 may include privileged-processor-mode region 110, communication module 112, processor 130, and network interface 140. A computing device 320 may include security module 120, and communication module 112 may send periodic security communications to security module 120 over network 330.

Computing devices 310 and/or 320 generally represent any type or form of computing devices capable of reading computer-executable instructions. Examples of computing devices 310 and/or 320 include, without limitation, laptops, desktops, servers, cellular phones, personal digital assistants ("PDAs"), multimedia players, embedded systems, combinations of one or more of the same, exemplary computing system 510 in FIG. 5, or any other suitable computing device.

Computing device 310 may communicate with computing device 320 over a network 330. Network 330 generally represents any medium or architecture capable of facilitating communication or data transfer. Network 330 may include, without limitation, an intranet, a Wide Area Network ("WAN"), a Local Area Network ("LAN"), a Personal Area Network ("PAN"), the Internet, Power Line Communications ("PLC"), a cellular network (e.g., a GSM network), or the like. Network 330 may facilitate communication or data transfer using wireless and/or wired communications.

FIG. 4 illustrates an exemplary method for detecting rootkits. The steps in FIG. 4 may be performed by one or more components of systems 100, 200, and/or 300. For example, at step 410 communication module 112 may send periodic security communications from a privileged-processor-mode region of a computing device. A periodic security communication may be sent in regular intervals (e.g., seconds, hours, days, etc.). In other embodiments, periodic security communications may be sent at irregular intervals.

Periodic security communications may include any security communication that indicates communication module 112 has not been compromised. For example, a periodic security communication may include a heartbeat (e.g., a notification) that indicates communication module 112 is functioning and has not been overwritten. In some embodiments, one or more periodic security communications may include one or more security codes. A security code may include any data that indicates a security communication is sent from communication module 112 and has not been spoofed by malicious code.

At step 420, security module 120 may identify at least one of the periodic security communications. In some embodiments, security module 120 may continually identify the periodic security communications as they are sent from communication module 112. Security module 120 may identify periodic security communications by checking a storage location where communication module 112 stores the security communications. In other embodiments, security module 120 may identify periodic security communications when security module 120 receives the security communications from communication module 112. In such embodiments, the periodic security communications may include any suitable network communications, such as UDP packets.

At step 430, security module 120 may determine whether privileged-processor-mode region 110 has been compromised based on the periodic security communications. A privileged-processor-mode region may be compromised when malicious code is installed in the privileged-processor mode region. In some embodiments, security module 120 may determine that privileged-processor-mode region 110 has been compromised if security module 120 determines that communication module 112 had stopped sending security communications. For example, security module 120 may determine that privileged-processor-mode region 110 has been compromised when a security communication is not received at an expected time. Communication module 112 would no longer send communications if it has been overwritten by malicious code. Thus, the failure of communication module 112 to send communications may indicate that privileged-processor-mode region 110 has been infected.

In some embodiments, security module 120 may determine that privileged-processor-mode region 110 has been compromised when a predetermined number of security codes are not received. For example, if security module 120 determines that communication module 112 has not sent the last five expected security codes, security module 120 may determine that privileged-processor-mode region 110 has been compromised (e.g., possibly infected with malware).

Additionally or alternatively, security module 120 may determine that privileged-processor-mode region 110 has been compromised if security module 120 does not identify a security communication for a predefined amount of time. For example, if security module 120 waits more than 10 minutes and has not received a security communication from communication module 112, security module 120 may determine that privileged-processor-mode region 110 has been compromised.

According to various embodiments, security module 120 may check the contents of one or more security communications to determine whether the security communications were sent from communication module 112. For example, communication module 112 may include a security code in one or more security communications to protect against malicious code that might attempt to spoof a security communication.

A security communication may include an encrypted message (e.g. a security code) that shows that the security communication is from communication module 112. For example, communication module 112 may communicate with a Trusted Platform Module ("TMP") to obtain one or more security keys to use for encryption. Since malicious code would not be able to communicate with the TPM, malicious code would not be able to spoof encrypted communications expected by security module 120. Any suitable encryption techniques and/or technology may be implemented to provide encrypted security communications. In some embodiments, communication module 112 may send encrypted information in every security communication. In other embodiments, communication module 112 may only send encrypted information in some security communications. For example, every Nth security communication may include encrypted information.

In various embodiments, communication module 112, security module 120, and/or any other security code may lock privileged-processor-mode region 110 after communication module 112 is installed in privileged-processor-mode region 110. For example, security module 120 may set a lock bit (e.g., a D_LCK bit) in system-management-control register 114. Locking privileged-processor-mode region 110 may protect privileged-processor-mode region 110 against rootkits being installed in privileged-processor-mode region 110. However, malicious programmers may develop rootkits that are able to unlock and/or subvert the locking technology of privileged-processor-mode region 110. In such situations, the security technologies discussed herein may detect that a rootkit has compromised privileged-processor-mode region 110.

After determining that privileged-processor-mode region 110 has been compromised, security module 120 may perform a security action. For example, security module 120 may send a security notification if privileged-processor-mode region 110 has been compromised. In some embodiments, privileged-processor-mode region 110 may send the security notification to a user and/or a security software vendor. In addition to and/or instead of providing a security notification, security module 120 may perform a remediation action. For example, security module 120 may attempt to remove any malicious code installed in the privileged-processor-mode region and/or may provide instructions for removing the malicious code.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the sending, identifying, determining, storing, reading, accessing, locking, setting, installing, including, and performing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory ("RAM"), read only memory ("ROM"), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output ("I/O") controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as sending, identifying, determining, storing, reading, accessing, locking, setting, installing, including, and performing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the sending, identifying, determining, storing, reading, accessing, locking, setting, installing, including, and performing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the sending, identifying, determining, storing, reading, accessing, locking, setting, installing, including, and performing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the sending, identifying, determining, storing, reading, accessing, locking, setting, installing, including, and performing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the sending, identifying, determining, storing, reading, accessing, locking, setting, installing, including, and performing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit ("ASIC") adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network ("WAN"), a local area network ("LAN"), a personal area network ("PAN"), or the Internet.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage ("NAS") devices configured to communicate with servers 640 and 645 using various protocols, such as NFS, SMB, or CIFS.

Servers 640 and 645 may also be connected to a storage area network ("SAN") fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the sending, identifying, determining, storing, reading, accessing, locking, setting, installing, including, and performing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of the exemplary methods described and/or illustrated herein. For example, a computing system (e.g., computing system 510 and/or one or more of the components of network architecture 600) may perform a computer-implemented method for detecting rootkits. In certain embodiments, the computing system may send periodic security communications from a privileged-processor-mode region of a computing device. The computing system may also identify at least one of the periodic security communications. The computing system may further determine, based on the periodic security communications, whether the privileged-processor-mode region of the computing device has been compromised.

In some embodiments, the computing system may identify at least one of the periodic security communications by identifying a first security communication. The computing system may also determine whether the privileged-processor-mode region of the computing device has been compromised by determining that a second security communication was not received at an expected time. In other embodiments, the computing system may identify at least one of the periodic security communications by identifying a first security communication. The computing system may determine whether the privileged-processor-mode region of the computing device has been compromised by determining that a second security communication does not include an expected security code. In at least one embodiment, the expected security code may be an encrypted security code. In some embodiments, the computing system may comprise a security computing subsystem.

In various embodiments, the computing system may send the periodic security communications by storing a security message in a first storage location on the computing device. The computing system may identify at least one of the periodic security communications by reading the security message from the first storage location. In some embodiments, the computing system may send the periodic security communications by accessing a network interface card, and by sending at least one security communication to a remote computing device. The remote computing device may comprise the security computing subsystem. In certain embodiments, the periodic security communications may comprise universal-datagram-protocol packets.

In at least one embodiment, the computing system may lock the privileged-processor-mode region of the computing device such that the privileged-processor-mode region is read-only. In some embodiments, the computing system may lock the privileged-processor-mode region of the computing device by setting a D_LCK bit in a system-management-control register of the computing device. In some embodiments, the computing system may install security code in the privileged-processor-mode region of the computing device. The security code may be programmed to send the periodic security communications. In other embodiments, the security code may include a system-management-mode handler.

In certain embodiments, the computing system may include security code in software programmed to execute from the privileged-processor-mode region of the computing device. The security code may be programmed to send the periodic security communications. In some embodiments, the computing device may include an x86 processor, and the privileged-processor-mode region of the computing device may include system-management-mode random-access-memory space. In at least one embodiment, the computing system may perform a security action after determining that the privileged-processor-mode region of the computing device is infected with a rootkit.

In some embodiments, the computing system may include privileged-processor-mode memory space. The privileged-processor-mode memory space may comprise a communication module. The communication module may send periodic security communications. The computing system may also contain a security module. The security module may identify at least one of the periodic security communications. The security module may also determine, based on the periodic security communications, whether the privileged-processor-mode memory space has been compromised. In at least one embodiment, the computing system may contain an x86 processor. The privileged-processor-mode memory space may include system-management-mode random-access-memory space, and the communication module may include a system-management-mode handler.

In various embodiments, the computing system may include a system-management-control register that may comprise a D_LCK bit. At least one of the communication module and the security module may set the D_LCK bit to lock the system-management-mode random-access-memory space. In some embodiments, the security module may identify a first security communication. The security module may determine whether the privileged-processor-mode memory space has been compromised by determining that a second communication was not received at an expected time, and/or by determining that the second communication does not include an expected security code.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method comprising:
   installing security code in a privileged-processor-mode region of a computing device;
   sending, from the security code, periodic security communications from the privileged-processor-mode region of the computing device by:
      accessing, via the security code, a network interface card, the accessing the network interface card being performed from within the privileged-processor-mode region of the computing device, and
      sending, via the network interface card, at least one security communication from the privileged-processor-mode region to a remote computing device, the remote computing device comprising a security computing subsystem;
   identifying at least one of the periodic security communications;
   determining, based on the periodic security communications, whether the privileged-processor-mode region of the computing device has been compromised, wherein the security computing subsystem performs the identifying and the determining.

2. The computer-implemented method of claim 1, wherein:
   identifying at least one of the periodic security communications comprises identifying a first security communication;
   determining whether the privileged-processor-mode region of the computing device has been compromised comprises determining that a second security communication was not received at an expected time.

3. The computer-implemented method of claim 1, wherein:
   identifying at least one of the periodic security communications comprises identifying a first security communication;
   determining whether the privileged-processor-mode region of the computing device has been compromised comprises determining that a second security communication does not include an expected security code.

4. The computer-implemented method of claim 3, wherein the expected security code comprises an encrypted security code.

5. The computer-implemented method of claim 1, wherein the computing device comprises the security computing subsystem and the security subsystem is not located in the privileged-processor-mode region of the computing device.

6. The computer-implemented method of claim 5, wherein:
   sending the periodic security communications comprises storing a security message in a first storage location on the computing device;
   identifying at least one of the periodic security communications comprises reading the security message from the first storage location.

7. The computer-implemented method of claim 1, wherein the security code directly accesses the network interface card.

8. The computer-implemented method of claim 1, wherein the periodic security communications comprise universal-datagram-protocol packets.

9. The computer-implemented method of claim 1, further comprising:
   locking the privileged-processor-mode region of the computing device such that the privileged-processor-mode region is read-only.

10. The computer-implemented method of claim 9, wherein locking the privileged-processor-mode region of the computing device comprises setting a D_LCK bit in a system-management-control register of the computing device.

11. The computer-implemented method of claim 1, wherein the security code comprises a system-management-mode interrupt handler to which control is transferred when an interrupt causes a processor of the computing device to enter a privileged-processor mode.

12. The computer-implemented method of claim 1, wherein the privileged-processor-mode region of the computing device comprises memory and/or storage associated with a privileged-processor mode of a processor of the computing device.

13. The computer-implemented method of claim 1, wherein:
   the computing device comprises an x86 processor;
   the privileged-processor-mode region of the computing device comprises system-management-mode random-access-memory space.

14. The computer-implemented method of claim 1, further comprising performing a security action after determining that the privileged-processor-mode region of the computing device has been compromised.

15. A system comprising:
a network interface card;
an installation module programmed to install a communication module to privileged-processor-mode memory space, the communication module being programmed to send periodic security communications by:
- accessing, via the communication module, the network interface card, the accessing the network interface card being performed from within the privileged-processor-mode memory space, and
- sending, via the network interface card, at least one security communication from the privileged-processor-mode memory space to a remote computing device, the remote computing device comprising a security subsystem;

a security module within the security subsystem, the security module being programmed to:
- identify at least one of the periodic security communications;
- determine, based on the periodic security communications, whether the privileged-processor-mode memory space has been compromised.

16. The system of claim 15, further comprising:
an x86 processor, wherein:
- the privileged-processor-mode memory space comprises system-management-mode random-access-memory space;
- the communication module comprises a system-management-mode handler.

17. The system of claim 16, wherein the privileged-processor-mode memory space of a computing device comprises memory and/or storage associated with an advanced processor operating mode used for at least one of:
advanced power-management features;
system events;
system safety functions;
hardware emulation;
emulating and/or forwarding calls to a Trusted Platform Module.

18. The system of claim 15, wherein:
the privileged-processor-mode memory space of a computing device is isolated from other memory and locked against write access from processor modes other than a privileged-processor-mode of a processor of the computing device.

19. A physical computer-readable-storage medium comprising one or more computer-executable instructions that, when executed by a computing device, cause the computing device to:
install security code in a privileged-processor-mode region of the computing device;
send, from the security code, periodic security communications from the privileged-processor-mode region of the computing device by:
- accessing, via the security code, a network interface card, the accessing the network interface card being performed from within the privileged-processor-mode region of the computing device, and
- sending, via the network interface card, at least one security communication from the privileged-processor-mode region to a remote computing device, the remote computing device comprising a security computing subsystem;

identify at least one of the periodic security communications;
determine, based on the periodic security communications, whether the privileged-processor-mode region of the computing device has been compromised, wherein the security computing subsystem performs the identifying and the determining.

* * * * *